(12) United States Patent
Schmidtke et al.

(10) Patent No.: US 11,847,403 B2
(45) Date of Patent: Dec. 19, 2023

(54) CHANGE RENDERING FOR GENERATED DOCUMENTS

(71) Applicant: Microsoft Technology Licensing, LLC, Redmond, WA (US)

(72) Inventors: Rhys Martin Schmidtke, Seattle, WA (US); Nimesha Muthya, Seattle, WA (US); James Zhang, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/333,825

(22) Filed: May 28, 2021

(65) Prior Publication Data

US 2022/0382961 A1    Dec. 1, 2022

(51) Int. Cl.
*G06F 17/00*     (2019.01)
*G06F 40/106*    (2020.01)
(Continued)

(52) U.S. Cl.
CPC .......... *G06F 40/106* (2020.01); *G06F 16/93* (2019.01); *G06F 40/197* (2020.01)

(58) Field of Classification Search
CPC ...... G06F 40/106; G06F 16/93; G06F 40/197; G06F 16/1767; G06F 16/273; G06F 16/275

(Continued)

(56) References Cited

U.S. PATENT DOCUMENTS

| 7,568,154 B2 | 7/2009 | Salesin et al. |
| 7,721,200 B2 | 5/2010 | Grigoriadis et al. |

(Continued)

FOREIGN PATENT DOCUMENTS

WO    2014100680 A1    6/2014

OTHER PUBLICATIONS

Marian, et al., "Change-Centric Management of Versions in an XML Warehouse", In Proceedings of the 27th International Conference on Very Large Data Bases, Sep. 11, 2001, 10 Pages.

(Continued)

*Primary Examiner* — Jason T Edwards
(74) *Attorney, Agent, or Firm* — Weaver IP L.L.C.

(57) ABSTRACT

Methods, systems, apparatuses, and computer-readable storage mediums are described for rendering document changes. A first document is rendered in a client user interface (UI) based at least on a first intermediate format representation obtained from a server. A change initiator receives a request for a change to the first document and transmits information indicative of the change to the server. A client renderer selectively modifies a portion of the first intermediate format representation at the client based on the change and renders a modified first document in the UI based at least on the modified first intermediate format representation. The client renderer obtains a second intermediate format representation from the server, where the second intermediate format representation comprises an intermediate format representation generated through processing an updated document definition. The client renderer renders the second document in the UI based at least on the second intermediate format representation.

20 Claims, 8 Drawing Sheets

(51) Int. Cl.
  *G06F 16/93* (2019.01)
  *G06F 40/197* (2020.01)
(58) Field of Classification Search
  USPC .......................................................... 715/243
  See application file for complete search history.

(56) References Cited

U.S. PATENT DOCUMENTS

| | | |
|---|---|---|
| 8,205,150 B2 | 6/2012 | Gelman et al. |
| 8,209,308 B2 | 6/2012 | Rueben et al. |
| 2004/0093564 A1 | 5/2004 | Kumhyr et al. |
| 2006/0184867 A1 | 8/2006 | Shpigel et al. |
| 2008/0133618 A1* | 6/2008 | Kawabe ............... G06F 40/197 |
| | | 707/999.203 |
| 2010/0161717 A1 | 6/2010 | Albrecht et al. |
| 2017/0060812 A1* | 3/2017 | Williams .............. G06F 40/103 |
| 2017/0310791 A1 | 10/2017 | Palse et al. |
| 2018/0052940 A1 | 2/2018 | Miller et al. |
| 2019/0138283 A1 | 5/2019 | Pletter et al. |
| 2020/0067997 A1* | 2/2020 | Hardee ................. G06F 40/166 |

OTHER PUBLICATIONS

"International Search Report and Written Opinion Issued in PCT Application No. PCT/US22/027552", dated Aug. 25, 2022, 9 Pages.

\* cited by examiner

200

202 — Receive a request for a first change to a first document rendered in a client user interface, the first document rendered based at least on a first intermediate format representation obtained from a server 204 — Transmit information indicative of the first change to the first document to the server 206 — Selectively modify only a portion of the first intermediate format representation at the client based on the first change 208 — Render a modified first document in the client user interface based at least on the modified first intermediate format representation 210 — Obtain a second intermediate format representation from the server, the second intermediate format representation comprising an intermediate format representation generated through processing a document definition that has been updated based at least on the information indicative of the first change to the first document 212 — Render a second document in the client user interface based at least on the second intermediate format representation

FIG. 2

CHANGE RENDERING FOR GENERATED DOCUMENTS

BACKGROUND

Document definitions may be used to generate documents for a wide variety of applications. In many instances, a document definition may include information that defines how the document is generated, such as identifying which data should be presented in the generated document, the arrangement of the data, formatting of document elements, etc. In order to make changes to the generated document, an author typically modifies the document definition from which the generated document was created. In order to view the results of the author's changes, the document is regenerated from the updated document definition, often by a server that is located remote from the user's device. For instance, if a user wishes to add a new field or update a formatting of the document, the document definition needs to be updated after which the new document is generated depicting those changes.

However, regeneration of a document from an updated document definition can be a time-consuming process, often consuming a large amount of computing resources. For example, each time a document is generated (or regenerated), the document definition is processed to evaluate expressions contained therein, obtain data to include in the document, and format the document according to the definition. As a result, even minor changes to a document definition can be time-consuming. As the creation of documents is typically an iterative process which involves many alterations to the underlying definition to achieve the desired output, the overall process to create a final document can therefore be cumbersome and inefficient.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for rendering document changes. In one example, a first document is rendered in a client user interface based at least on a first intermediate format representation obtained from a server. A change initiator receives a request for a first change to the first document (e.g., a first instance of a document) rendered in the user interface and transmits information indicative of the first change to the first document to the server. A client renderer selectively modifies only a portion of the first intermediate format representation at the client based on the first change and renders a modified first document (e.g., a second instance of the document) in the client user interface based at least on the modified first intermediate format representation. The client renderer also obtains a second intermediate format representation from the server, where the second intermediate format representation comprises an intermediate format representation generated through processing a document definition that has been updated based at least on the information indicative of the first change to the first document. The client renderer renders the second document (e.g., a third instance of the document) in the client user interface based at least on the second intermediate format representation.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a flowchart of a method for rendering document changes, in accordance with an example embodiment.

Figure 1:
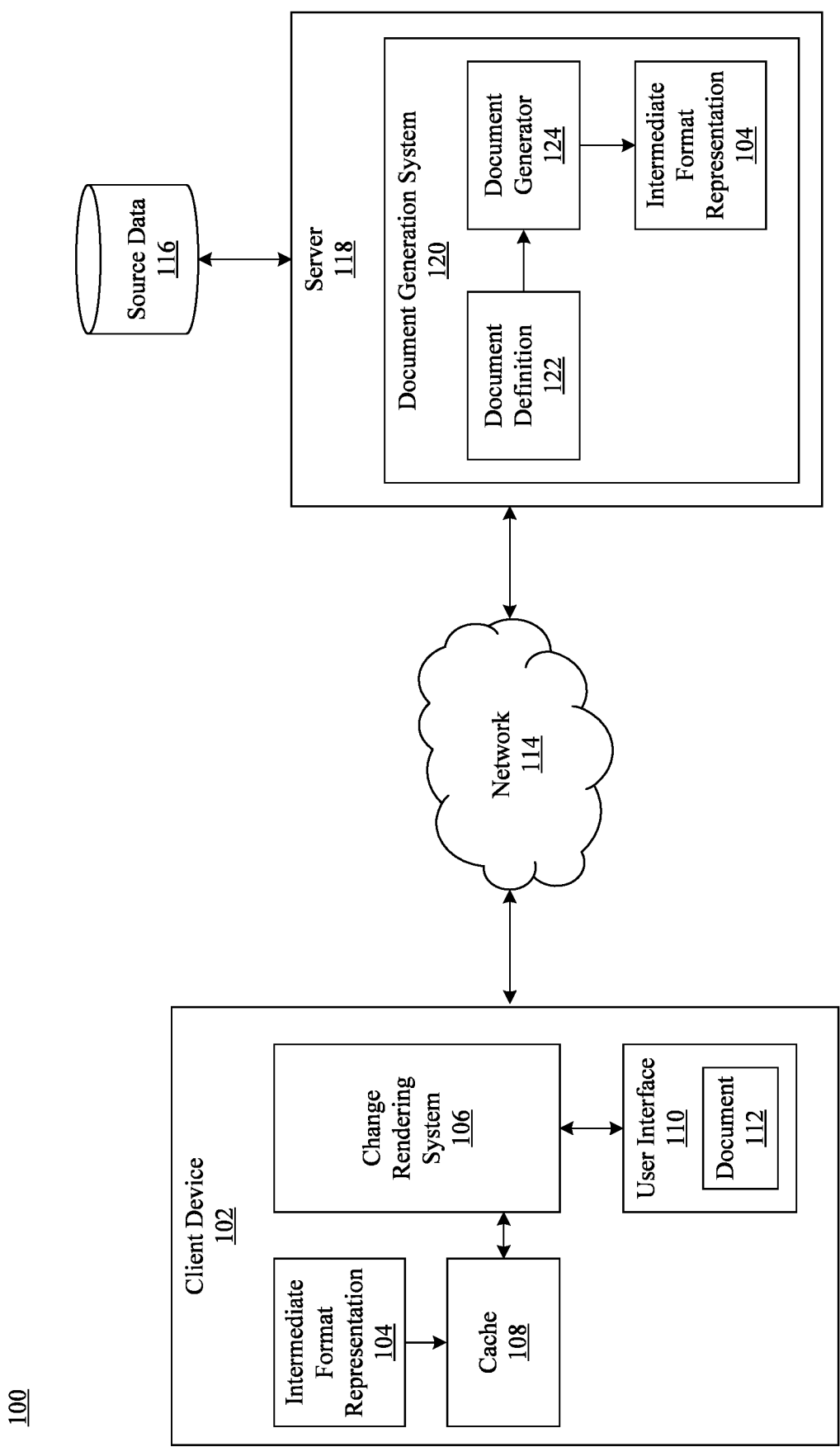
FIG. 1 shows a block diagram of a system for rendering document changes, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Document definitions may be used to generate documents for a wide variety of applications. In many instances, a document definition may include information that defines how the document is generated, such as identifying which data should be presented in the generated document, the arrangement of the data, formatting of document elements, etc. In order to make changes to the generated document, an author typically modifies the document definition from which the generated document was created. In order to view the results of the author's changes, the document is regenerated from the updated document definition, often by a server that is located remote from the user's device. For instance, if a user wishes to add a new field or update a formatting of the document, the document definition needs to be updated after which the new document is generated depicting those changes.

However, regeneration of a document from an updated document definition can be a time-consuming process, often consuming a large amount of computing resources. For example, each time a document is generated (or regenerated), the document definition is processed to evaluate expressions contained therein, obtain data to include in the document, and format the document according to the definition. As a result, even minor changes to a document definition can be time-consuming. As the creation of documents is typically an iterative process which involves many alterations to the underlying definition to achieve the desired output, the overall process to create a final document can therefore be cumbersome and inefficient.

Embodiments described herein are directed to rendering document changes. In an example system, a first document is rendered in a client user interface based at least on a first intermediate format representation obtained from a server. A change initiator receives a request for a first change to the first document rendered in the user interface and transmits information indicative of the first change to the first document to the server. A client renderer selectively modifies only a portion of the first intermediate format representation at the client based on the first change and renders a modified first document in the client user interface based at least on the modified first intermediate format representation. The client renderer also obtains a second intermediate format representation from the server, where the second intermediate format representation comprises an intermediate format representation generated through processing a document definition that has been updated based at least on the information indicative of the first change to the first document. The client renderer renders the second document in the client user interface based at least on the second intermediate format representation. In this manner, document changes may be rendered in the client user interface prior to the document being regenerated (e.g., by the server).

The embodiments described herein may advantageously improve resource utilization, such as reducing processing resources, networking, and storage resources of computing devices in which documents are generated, rendered, and/or edited. For instance, techniques described herein may enable changes to a document to be rendered at a client user interface without waiting for a full regeneration of the document (e.g., by a server), thereby allowing the changes to be rendered quicker and with less computing resources (e.g., by modifying an intermediate representation previously received from the server). Since such changes may be presented at a user interface without having to wait for the server to regenerate the entire document, the client device on which the document is rendered need not expend resources in obtaining a new intermediate representation (which may contain a large amount of data) from the server that includes the change and rendering the new representation. Rather, the client may render the change locally by altering the previously received representation, thereby reducing the processing, storage, and network resources.

Further, resource utilization at the server may also be improved in accordance with techniques described herein. For instance, where multiple successive changes are made to the document at the client user interface, re-rendering of the document at the server may be canceled in some instances (e.g., canceling the re-rendering of a first change where an additional change is received prior to completion of the first re-rendering). Such embodiments may not only reduce processing resources but may also reduce storage and/or network utilization as well since the canceled re-renders need not be stored or transmitted from the server to the client. In the above manner, improvements to the functioning of the computing devices involved in generating, rendering, and editing documents are achieved, as well the networks to which those computing devices are coupled.

Furthermore, improvements to a graphical user interface may also be attained in accordance with techniques described herein. For instance, since document changes may be rendered locally without having to wait for a server to complete a full regeneration of the document, rendering of document changes in the client user interface may be carried out in a quicker fashion. Such improvements therefore may improve both the user interface (e.g., by presenting changes with reduced wait time) as well as the user experience in editing and viewing documents.

As such, example embodiments are described herein directed to techniques for rendering document changes. For instance, FIG. 1 shows a block diagram of a system 100 for rendering documents on a client device, in accordance with an example embodiment. As shown in FIG. 1, system 100 includes a client device 102, a network 114, source data 116, and a server 118. Client device 102 includes an intermediate firmware representation 104, a change rendering system 106, a cache 108, and a user interface (UI) 110. As shown in FIG. 1, UI 112 may render a document 112 therein. Server 118 includes a document generation system 120. Document generation system 120 includes a document definition 122, a document generator 124, and an intermediate format representation 104. Example computing devices that may incorporate the functionality of client device 102, source data 116, and server 118 (or any subcomponents therein) are described below in reference to FIG. 10. It is noted that system 100 may comprise any number of devices, including those illustrated in FIG. 1 and optionally one or more further devices or components not expressly illustrated. System 100 is further described as follows.

Network 114 may include one or more of any of a local area network (LAN), a wide area network (WAN), a personal area network (PAN), a combination of communication networks, such as the Internet, and/or a virtual network. In example implementations, client device 102, server 110, and source data 116 may be communicatively coupled to each other via network 114. In an implementation, any one or more of client device 102, server 110, and source data 116 may communicate via one or more application programming interfaces (API) and/or according to other interfaces and/or techniques. Client device 102, server 110, and source data 116 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Client device 102 includes any one or more computing devices of one or more users (e.g., individual users, family users, enterprise users, governmental users, etc.) that may comprise one or more applications, operating systems, virtual machines, storage devices, etc. that may be used to access, create, view, edit, and/or store documents. Client device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Client device 102 is not limited to a physical machine, but may include other types of machines or nodes, such as a virtual machine. Client device 102 may interface with other components illustrated in FIG. 1 through APIs and/or by other mechanisms.

In examples, client device 102 may have software installed or stored thereon. Such software may include any type of software for execution using one or more processing components, such as software for presenting and/or editing document 112. As used herein, document 112 may include a collection of information arranged in a particular manner. Examples of such documents include, but are not limited to, reports (e.g., business intelligence reports, paginated reports, etc.), spreadsheets, text-based documents, images, videos, etc. (including any combination thereof). Document 112 may comprise any type of file or file structure, including but not limited to Hyper Text Markup Language (HTML) files, Extensible Markup Language (XML) files, .XLS or .XLSX files, .DOC or .DOCX files, Portable Document Format (PDF), image and/or video files (e.g., .JPG, .GIF, .PNG, .BMP, .MP4, .AVI, .MOV, etc.), or any other files as appreciated to those skilled in the relevant arts.

In some examples, document 112 may be generated and/or rendered based on intermediate format representation 104. Intermediate format representation may comprise any file that identifies, among other things, information relating to how data should be rendered in document 112 (e.g., the arrangement and/or content of document 112). Examples of information contained in intermediate format representation 104 include, but not limited to, an identification of data to be included in document 112, a layout of such data, document elements (e.g., tables) in which data should be presented, formatting information identifying how text and/or graphics should be rendered in document 112, and/or any other information specifying the arrangement and/or content of document 112. In examples, intermediate format representation 104 may comprise any suitable file containing language that identifies an arrangement and content of document 112, such as JavaScript Object Notation (JSON) files, XML files, HTML files, or other suitable files.

Intermediate format representation 104 may be generated from one or more other files, such as document definitions. Intermediate format representation 104 may be generated at client device 102 or at any other computing device, such as server 118. In examples where server 118 generates intermediate format representation 104 from a document definition, client device 102 may obtain the generated intermediate format representation from server 118 and then render document 112 based thereon in UI 110.

In implementations, document 112 may be rendered on user interface 110. User interface (UI) 110 may comprise any suitable user interface for interaction (e.g., via a web browser by navigation to a web page, via an application stored thereon, etc.), examples of which are described below with respect to FIG. 10. In some examples, UI 110 may comprise a web-based authoring tool that comprises an interface via which document 112 may be created, selected (e.g., from among a plurality of documents), edited, viewed, etc. For instance, UI 110 may provide an interface via which document 112 may be accessed from a storage of client device 102 and/or from another computing device (e.g., a remotely located storage device) for rendering on UI 110. In examples, UI 110 comprises one or more UI elements (e.g., display windows, interactive elements, menus, text-input fields, etc.) via which document 112 may be interacted with for creating, editing, and/or viewing.

Change rendering system 106 may be configured to render document 112, including any changes made thereto, on UI 110. In examples, change rendering system 106 may receive, from UI 110, one or more requests to make a change to document 112. In response to such requests, change rendering system 106 may selectively modify intermediate format representation 104 (e.g., by modifying only a portion thereof) to include an indication of the change requested. Upon modifying intermediate format representation 104, change rendering system 106 may store a modified intermediate format representation in cache 108 and render a modified version of document 112 in UI 110 that includes a representation of the change requested. Cache 108 may comprise any type of storage device that is included in or otherwise accessible to client device 102 and that contains intermediate format representation 104 and/or any modified or updated versions thereof. For instance, cache 108 may comprise one or more disks, hard disk drives, solid-state devices (SSDs), random access memory (RAM) devices, etc. Cache 108 may also comprise one or more tiers or levels, such as L1 (e.g., on chip), L2 (on-chip, but slower than L1 cache), main memory (e.g., RAM), and/or any other tiers, as appreciated by those skilled in the relevant arts.

In implementations, change rendering system 106 may also cause an indication of the requested change to be transmitted to one or more devices responsible for generating an updated intermediate format representation 104, such as server 118. In other words, change rendering system 106 may be configured to locally generate a revised document for rendering in UI 110, while another device (e.g., server 118) generates an updated intermediate format representation that includes a representation of the change.

In some example embodiments, the modified document rendered by locally modifying intermediate format representation 104 may include a representation of the change that is different from a representation of the change included within an updated document that is based on an updated intermediate format representation received from server 118. For instance, change rendering system 106 may modify intermediate format representation 104 in such a manner that the representation of the change comprises an approximation of the changes requested (e.g., by approximating the size, location, format, content, etc. of one or more UI elements associated with the requested changes). Examples of such representations that are rendered include a placeholder for information associated with a requested change (e.g., where the requested change includes insertion of additional data that is not included within intermediate format representation 104), modification of a document element (e.g., a table) that has a different size than a document element included in updated intermediate format representation received from server 118, or any other representation of a change (or approximation thereof) that may be rendered locally while server 118 generates an updated intermediate format representation containing a representation of the requested change.

Server 118 may comprise any number of devices, such as a network-accessible server (e.g., a cloud computing server network) that may comprise software or a service for creating, editing, viewing, and/or storing documents. In some examples, such a service may be provided as a cloud service that client device 102 may access (e.g., via a web browser or other software installed in client device 102) for designing documents. For instance, server 118 may comprise a group or collection of servers (e.g., computing devices) that are each accessible by a network such as the Internet (e.g., in a "cloud-based" embodiment). In example embodiments, server 118 is a computing device that is located remotely (e.g., in a different facility) from client device 102, and communicatively coupled thereto via network 114. Server 118 may comprise any number of computing devices, and may include any type and number of other resources, including resources that facilitate communications with and between servers, storage by the servers, etc. (e.g., network switches, storage devices, networks, etc.). In an embodiment, devices of server 118 may be co-located (e.g., housed in one or more nearby buildings with associated components such as backup power supplies, redundant data communications, environmental controls, etc.) to form a datacenter, or may be arranged in other manners. Accordingly, in an embodiment, server 118 may be a datacenter in a distributed collection of datacenters.

Document generation system 120 may be configured to, among other things, generate an intermediate format representation such that UI 110 may render a document based thereon. For instance, document generator 124 may obtain document definition 122 and generate intermediate format representation 104. Intermediate format representation 104 may be provided, via network 114 or via other means, to client device 102 upon which client device 102 may render document 112 therefrom in UI 110. In examples, document definition 122 may comprise any suitable language, such as markup language (e.g., XML, HTML, etc.) that defines a layout of information to be rendered in document 112. For instance, document definition 122 may identify information related to formatting or styling of document 112, an arrangement of document elements (e.g., visual elements) in document 112, and an identification of data for populating certain aspects of document 112. In some examples, document definition 122 may identify data sources, expressions to be evaluated (e.g., queries), and any other inputs (e.g., user-defined inputs) that are to be used when generating intermediate format representation 104. Document definition 122 may be generated manually (e.g., via a developer), or may be generated via interaction with a user interface, such as UI 110.

In some examples, document definition 122 may identify external data sources, such as source data 116, from which data is to be obtained for the rendering of document 112. Source data 116 may comprise any one or more repositories that store data that may populate any portion of document 112. Source data may include, for instance, financial or business information (e.g., sales, expenses, revenue, or income information), billing information, user information (e.g., names, addresses, account numbers), manufacturing information, or any other information that may be collected and/or maintained for an organization. Source data 116 may be stored in any suitable format (e.g., databases, lists, receipts, text files, logs, etc.), and may be stored local to and/or remote from server 118.

It is noted and understood that implementations are not limited to the illustrative arrangement shown in FIG. 1. For instance, client device 102, server 110, and source data 116 need not be separate or located remote from each other. In some examples, any one or more of client device 102, server 110, and source data 116 (or any subcomponents therein) may be located in or accessible via the same computing device or distributed across a plurality of devices. For instance, techniques described herein may be implemented in a single computing device (e.g., computing device 102), where the computing device may be configured to receive a requested change to a rendered document and modify an intermediate format representation associated therewith to render a representation of the requested change (e.g., an approximation of the change), while a separate process (e.g., in the background) on the same computing device performs a full regeneration that implements the change. Furthermore, system 100 may comprise any number of client devices, servers, and/or data sources (e.g., tens, hundreds, or even thousands of such devices) coupled in any manner.

Change rendering system 106 may operate in various ways to render document changes. For instance, change rendering system 106 may operate according to FIG. 2. FIG. 2 shows a flowchart 200 of a method for rendering document changes, in accordance with an example embodiment. For illustrative purposes, flowchart 200 and change rendering system 106 are described as follows with respect to FIG. 3.

Figure 3:
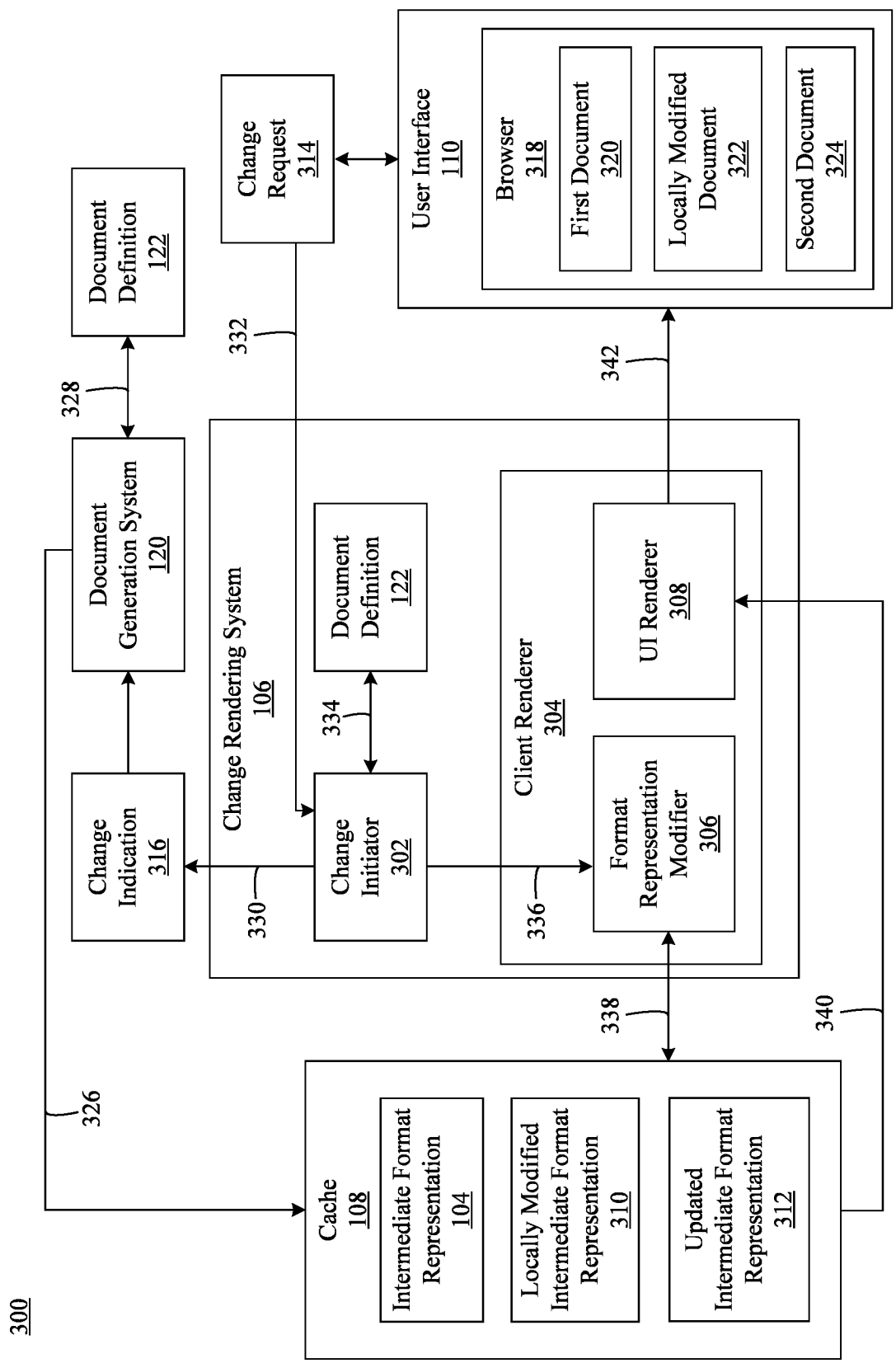
FIG. 3 shows a block diagram of a change rendering system implementing techniques described herein, in accordance with an example embodiment.

FIG. 3 shows a block diagram of a system 300 for rendering document changes, in accordance with an example embodiment. As shown in FIG. 3, system 300 includes an example implementation of change rendering system 106, cache 108, UI 110, document generation system 120, and document definition 122. System 300 further includes a change request 314 and a change indication 316. As shown in FIG. 3, change rendering system 106 includes a change initiator 302, document definition 122, and a client renderer 304. Client renderer 304 includes a format representation modifier 306 and a UI renderer 308. Cache 108 includes an example implementation of intermediate format representation 104, as well as a locally modified intermediate representation 310 and an updated intermediate format representation 312. UI 110 includes a browser 318. As shown in FIG. 3, browser 318 may render a first document 320, a locally modified document 322, and a second document 324. In examples, first document 320, locally modified document 322, and second document 324 may comprise instances of a document that are rendered at different times. For instance, first document 320 may comprise a first instance of a document (e.g., an initial version of a document) that is rendered based on intermediate format representation 104, locally modified document 322 may comprise a second instance of the document that is rendered based at least on locally modified intermediate format representation 310 after a change request is received, and second document 324 may comprise a third instance of the document that is rendered based at least on updated intermediate format representation 312 (e.g., received from document generation system 120). Flowchart 200 and system 300 are described in further detail as follows.

Flowchart 200 of FIG. 2 begins with step 202. In step 202, a request for a first change to a first document rendered in a client user interface is received, where the first document is rendered based at least on a first intermediate format representation obtained from a server. For instance, with reference to FIG. 3, change initiator 302 may be configured to receive 332 change request 314 via UI 110. Change request 314 may comprise a request for a change to any aspect of first document 320 rendered in UI 110. First document 320 may comprise any document designed in whole or in part via UI 110, selected for editing in UI 110, and/or presented for viewing in UI 110. First document 320 may be rendered on UI 110 based at least on a document definition as described herein. For instance, document generation system 120 at server 118 may obtain 328 document definition 122 for processing. Document generation system 120 may obtain document definition in various ways, such as by obtaining document definition 122 from client device 102, a data store or other co-located or remotely located storage (e.g., a cloud storage), or from any other computing device or storage. In examples, document generation system 120 may evaluate any user inputs and/or expressions (e.g., queries), obtain data from source data 116, and determine an arrangement of document elements and/or data as specified by document definition 122. In some implementations, document definition 122 may specify an output format (e.g., a PDF, a web document, etc.) of the document to be generated. Upon processing document definition 122 containing information regarding the arrangement of document elements and/or data, document generation system 120 may generate intermediate format representation 104 (e.g., according to the desired output format) that is provided 326 to cache 108 of client device 102.

UI renderer 308 may obtain 340 intermediate format representation 104 (e.g., via cache 108), and render 342 first document 320 on UI 110 using intermediate format representation 104. UI renderer 308 may be configured to take an intermediate format representation (e.g., JSON code) and convert it into a different format that may be rendered in UI 110 (e.g., an HTML format that may be rendered in a browser). In examples, UI 110 may comprise browser 318 (e.g., a web browser). However, it will be appreciated that browser 318 is not required in all implementations. Rather, in some other implementations, UI 110 may be part of any other software or application, such as a standalone application for viewing and/or editing documents, and/or can be rendered on the web or via network 114 in any other suitable manner.

First document 320 rendered on UI 110 may contain data and/or any number of document elements arranged as specified by document definition 122. Such document elements may include, but are not limited to, text, text boxes, rows, columns, tables, a tablix, graphics, any one or more of which may be populated using data from source data 116 as defined in document definition 122. In implementations, document elements may also be formatted based on indications contained within document definition 122. For instance, document definition 122 may specify a size, layout, font, typeface (e.g., bold, italics, condensed, extended, underlined, strikethrough, etc.), border or outline, etc. of one or more of the document elements defined in document definition 122. In some other implementations, document definition 122 may specify a positional information of document elements, such as positional relationships between document elements or positions of document elements with respect to the document as a whole (e.g., a location of a first table with respect to a second table, a location of text within a table or text box, a position of a header or company logo on the document, etc.). In the above manner, document definition 122 may therefore define the arrangement and/or content of document elements that should be present when first document 320 is rendered in UI 110.

As noted earlier, change request 314 may be received via UI 110. Change request 314 may comprise any change that is made on first document 320. For instance, change request 314 may include any request for a modification, addition, or deletion of one or more document elements in first document 320. Examples of such change requests include, but are not limited to, changes in the layout, content, calculations, expression evaluations, data inputs, format, styling, size, structure, typeface, border of any document element (e.g., bolding certain text, changing a title or header of a report, moving a table, adding a new column in a table, selecting an additional data input, resizing a table, etc.). These examples are illustrative only, and it is understood and appreciated to those skilled in the relevant arts that change request 314 may comprise any other type of change to first document 320. In implementations, such change requests may be made via interaction with one or more interactive elements in UI 110. Such interactive UI elements may include buttons, icons, menus, toolbars, pop-up windows, or any other UI element that may be used to modify, add, and/or delete document elements in first document 320.

It is also noted that change request 314 may comprise a request for a change to document elements that appear on the rendered document itself (e.g., first document 320) that contains the desired arrangement of data. In other words, in implementations, change request 314 may comprise edits or manipulations to an outputted document rendered in UI 110 which contains data (e.g., source data 116), rather than changes made to document definition 122 or intermediate format representation 104 from which the outputted document is rendered. However, it will be appreciated that in some implementations, change request 314 may also comprise a change to the underlying language (e.g., markup language) from which first document 320 was generated, such as document definition 122 and/or intermediate format representation 104.

In step 204, information indicative of the first change to the first document is transmitted to the server. For instance, with reference to FIG. 3, change initiator 302 may be configured to transmit 330 change indication 316 to document generation system 120 on server 118. Change indication 316 may include information indicative of change request 314 made to first document 320. In some examples, change indication 316 may comprise a portion of document definition 122 or intermediate format representation 104 to be changed based on change request 314. In some other examples, change indication 316 may comprise an identification of one or more document elements of first document 320 that are requested to be changed. In yet some other examples, change indication 316 may comprise transmitting change request 314 to document generation system 120.

In some implementations, change initiator 302 may transmit change indication 316 that includes information indicative of a plurality of change requests to first document 320 (e.g., as a batch of successive change requests). For instance, change indication 316 may be transmitted after a threshold number of change requests are received (e.g., three requests) or after the passage of a threshold time period. In yet some other examples, change initiator 302 may transmit change indication 316 each time a change request is received for first document 320.

In examples, change indication 316 may be provided to document generation system 120 for updating document definition 122 and/or generating an updated intermediate format representation. For instance, because change request 314 comprises a request to alter one or more aspects of first document 320 (e.g., an alteration to a document element contained therein) that was generated based on intermediate format representation 104, an updated intermediate format representation may be generated that results in rendering of an updated document. Document generation system 120 may generate the updated intermediate format representation in a similar manner as generation of intermediate format representation 104, such as by evaluating any user inputs and/or expressions (e.g., queries), obtaining data from source data 116, and determining an arrangement of document elements and/or data as specified by the updated document definition. It is noted and understood that document definition 122 may be updated 334 according to change request 314 and/or change indication 316 at client rendering system 106, or may be updated at server 118.

In step 206, only a portion of the first intermediate format representation is selectively modified at the client based at least on the first change. For instance, with reference to FIG. 3, format representation modifier 306 of client renderer 304 may receive 336 an indication of the change from change initiator 302 and selectively modify 338 only a portion of intermediate format representation 104 based at least on change request 314. In examples, format representation modifier 306 may generate locally modified intermediate format representation 310 based at least on intermediate format representation 104 and change request 314.

Format representation modifier 306 may generate locally modified intermediate format representation 310 in various ways. For instance, format representation modifier 306 may determine which portion or portions of intermediate format representation 104 to modify based on change request 314. In some implementations, such as where intermediate format representation 104 comprises a JSON representation, format representation modifier 306 may selectively modify portions of the JSON representation to generate locally modified intermediate format representation 310 and store locally modified intermediate format representation 310 in cache 108. Format representation modifier 306 may determine which portion(s) of the intermediate format representation to modify based on a mapping between the change operation to be performed as indicated by change request 314 and document definition 122. For instance, by determining how the change operation maps to document definition 122, format representation modifier 306 may determine which portion(s) of the intermediate format representation should be modified to include a representation of the change locally. As described below, client renderer 304 may use locally modified intermediate format representation 310 when rendering a modified document in UI 110 that includes a representation of change request 314.

In implementations, locally modified intermediate format representation 310 may therefore contain a representation of change request 314 made to first document 320. In some examples, the representation of change request 314 included within locally modified intermediate format representation 310 may comprise a representation (e.g., an approximation in some instances) of the change made to first document 320, where the representation does not require access to additional data or expressions that are available to document generation system 120 or may be time consuming or expensive to transfer. In some examples, locally modified intermediate format representation 310 may contain code to alter an aspect of a document element in first document 320, such as a formatting change within document 320, insertion of a title, repositioning of an element, etc. In other words, a representation of such changes can be made directly to intermediate format representation 104 in parallel with document generation system 120 processing an updated document definition as described herein.

In some other examples, locally modified intermediate format representation 310 may contain code to represent change request 314 as a placeholder for an added document element (e.g., a new table, column of data, expression, etc.). For instance, where change request 314 includes a request that requires additional data to be obtained from source data 116 or evaluations of expressions to be performed by document generation system 120, format representation modifier 306 may generate locally modified intermediate format representation 310 such that a modified document can still be presented to the user including a representation of the change (e.g., a placeholder for the data), while document generation system 120 generated an updated intermediate format representation 104 in the background that includes the requested change (including any new data requested by the change). In other words, in accordance with techniques described herein, format representation modifier 306 may generate a modified intermediate format representation that at least approximates a representation of change request 314 such that a modified document can be rendered in UI 110 while the server performs different actions (e.g., processing the document definition) to generate an updated intermediate format representation containing the actual change.

Thus, in some implementations, format representation modifier 306 may determine how to generate locally modified intermediate format representation 310 based on a type, class, or category of the change in change request 314. For instance, for changes that can be performed locally (e.g., formatting, text styling, border and box styling, changing height of fixed size elements, renaming a title, etc.), format representation modifier 306 may determine to modify the intermediate format representation to locally implement the change as requested (e.g., by making the change on the cached intermediate format representation). For some other types of changes that may be handled at least partially locally (e.g., changing a font size, adding a new document element such as a text box, adding text within a text box, etc.), the cached intermediate format representation can be modified with an approximation or estimation of how the change should be rendered in the document, while still sending a change indication in the background to document generation system 120 to process the change.

However, with changes that may require additional data or content that is not present at client device 102 (e.g., changes that add a new column of data to a table or tablix that was not included within first document 320, changing a query for a table or tablix, changes applied to images such as gauges or charts which will require a new image from the server, parameter changes, etc.), format representation modifier 306 may determine that the intermediate format representation should be modified to insert a new document element (e.g., a new column) along with a placeholder for the additional data or content contained therein which will be populated upon document generation system 120 generating an updated intermediate format representation. Thus, even if client device 102 does not contain certain data or content to implement change request 314, format representation modifier 306 may nevertheless generate locally modified intermediate format representation 310 that includes a representation of the change such that visual feedback of the change may be rendered in UI 110.

It is also noted, however, that even with changes that can be performed locally (e.g., formatting, renaming a title, etc.), locally modified intermediate format representation 310 may still not reflect the actual change as performed by document generation system 120. For instance, when a representation of a change is made locally to a document element (e.g., changing a text size), other document elements or a layout thereof in the document may unintentionally change by selectively modifying only a portion of the intermediate format representation. Thus, while such changes can still be made (e.g., as an approximation in some instances) locally and without waiting for the server to respond, the representation of such changes may not be the same as the representation of the change contained in an updated intermediate format representation received from document generation system 120 after an updated document definition containing the change is processed.

In step 208, a modified first document is rendered in the client user interface based at least on the modified first intermediate format representation. For instance, with reference to FIG. 3, UI renderer 308 may be configured to render locally modified document 322 in UI 110 based at least on locally modified intermediate format representation 310. As discussed, locally modified intermediate format representation 310 may be include all or part of change request 314 (e.g., an approximation of change request 314). Accordingly, once rendered to UI 110, locally modified document 322 may be rendered in a manner such that locally modified document 322 contains a representation of the change request 314 that is performed locally.

In implementations, UI renderer 308 may render locally modified document 322 on UI 110 from locally modified intermediate format representation 310 in a similar manner as described above with respect to rendering of first document 320. As noted earlier, since locally modified intermediate format representation 310 is generated locally based on change request 314 (e.g., without waiting for document generation system 120 to generate an updated intermediate format representation), UI renderer 308 may render locally modified document 322 containing feedback of the user's change operations in real-time or near real-time. In other words, since locally modified document 322 is rendered based on local alterations to the intermediate format representation, UI 110 may render approximation of the requested changes near immediately.

As discussed, once rendered in UI 110, locally modified document 322 may contain a representation of change request 314, such as formatting changes, repositioning of document elements, insertion of new document elements (e.g., a table with a placeholder for data), etc. In this manner, rather than waiting for a full regeneration of the document to be completed based on document generation system 120 which can be time consuming, UI renderer 308, such feedback of the user's changes can be rendered quickly and with reduced processing, storage, and network resources. Further, locally modified document 322 may be rendered in a manner that it will appear close to the final generated document once generated and rendered, thereby enabling a user to continue editing the rendered document without needing to wait for the server to respond.

In step 210, a second intermediate format representation is obtained from the server, where the second intermediate format representation comprises an intermediate format representation generated through processing a document definition that has been updated based at least on the information indicative of the first change to the first document. For instance, with reference to FIG. 3, UI renderer 308 may be configured to receive updated intermediate format representation 312 from document generation system 120. In examples, updated intermediate format representation 312 may be stored in cache 108, similar to intermediate format representation 104 and/or locally modified intermediate format representation 310. It is noted and understood, however, that cache need not keep a copy of each intermediate format representation as illustrated in FIG. 3. Rather, in some implementations, a previously generated intermediate format representation (e.g., intermediate format representation 104) may be replaced by an updated intermediate format representation (e.g., updated intermediate format representation 312).

Updated intermediate format representation 312 may be generated by document generation system 120 by processing an updated version of document definition 122 that has been updated based at least on change indication 316. In other words, once change request 314 is received by change initiator 302, document definition 122 may be updated (at client device 102 or server 118) based at least on the change, and document generation system 120 may process the updated document definition to generate updated intermediate format representation 312. Document generation system 120 may process the updated document definition in a similar manner as described above with respect to processing the initial document definition, such as by evaluating any user inputs and/or expressions (e.g., queries), obtain data from source data 116, and determine an arrangement of document elements and/or data as specified by the updated document definition. Document generation system 120 may provide updated intermediate format representation 312

(e.g., as JSON or other language) that implements change request 314 to client device 102 via network 114.

In step 212, a second document is rendered in the client user interface based at least on the second intermediate format representation. For instance, with reference to FIG. 3, UI renderer 308 may be configured to render second document 324 in UI 110 based at least on updated intermediate format representation 312 that contains a representation of change request 314. UI renderer 308 may render second document 324 in place of locally modified document 322, such as by replacing or substituting the rendering of locally modified document 322 with second document 324. In some instances, UI renderer 308 may cause a notification or other indication to be presented on UI 110 indicating that second document 324 (e.g., rendered based on processing of an updated document definition by the server) has been rendered in place of locally modified document 322. In other instances, UI renderer 308 may render second document 324 in place of locally modified document 322 without a notification or indication on UI 110, such that rendering second document 324 is performed in a transparent and/or seamless fashion.

In examples, locally modified document 322 may therefore include a representation of change request 314 that is different from a representation of change request 314 that is included in second document 324. For instance, because locally modified document 322 may be based on an intermediate format representation that is modified without server 318 performing a full processing of an updated document definition associated therewith, locally modified document 322 may not comprise the same final document that is rendered based on the full processing of the document definition that is performed by the server. In other words, locally modified document 322 may comprise a representation of change request 314 that approximates the implementation of the change request, while second document 324 may comprise a final document (e.g., does not contain approximations). For instance, as described herein, the representation of change request 314 included in locally modified document 322 may include a placeholder for information (e.g., data that is not accessible to client device 102), while the representation of change request 314 included in second document 324 includes the information (e.g., the data that is not accessible to client device 102 but may be accessible to server 118 upon processing the document definition) rather than a placeholder.

In yet some other examples, a representation of the change request 314 included in locally modified document 322 may include a document element that has a different size than a document element included in the representation of change request 314 included in second document 324. For instance, certain types of changes, when implemented locally in locally modified intermediate format representation 310, may unintentionally alter the sizing of one or more document elements, or alternatively may not resize one or more document elements in an accurate fashion (e.g., cell sizes of a table in response to font changes), resulting in locally modified document 322 being rendered in a manner that the sizing of a document element is different than a sizing of a document element that is included in the final document (e.g., second document 324). It is noted and understood, however, that examples are not limited to differences in sizing of document elements between locally modified document 322 and second document 324. Rather, representations of change request 314 may differ between locally modified document 322 and second document 324 in various other ways as described herein.

Thus, while the full document regeneration as a result of processing the updated document definition by document generation system 120 is being completed in the background and/or in parallel, UI renderer 308 may temporarily render locally modified document 322 until second document 324 is rendered. Such techniques may allow users to continue working on editing documents in UI 110 without waiting for document regeneration system 120 to process the updated document definition and provide the updated intermediate format representation back to client device 102.

Figure 4:
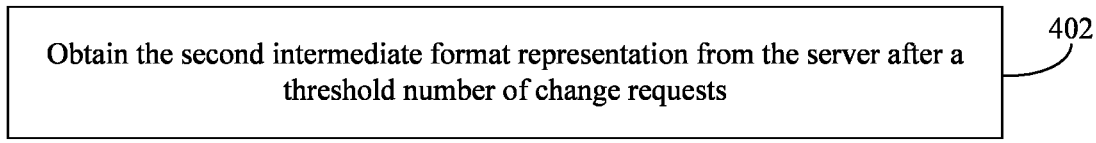
FIG. 4 shows a flowchart of a method for obtaining an intermediate format representation from a server, in accordance with an example embodiment.

In some implementations, a plurality of change requests may be performed prior to obtaining an updated representation from the server. For example, FIG. 4 shows a flowchart of a method for obtaining an intermediate format representation from a server, in accordance with an example embodiment. In an implementation, the method of flowchart 400 may be implemented by cache 108 and/or client renderer 304. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, the second intermediate format representation is obtained from the server after a threshold number of change requests. For instance, with reference to FIG. 3, cache 108 may obtain updated intermediate format representation 312 from document generation system 120 after a threshold number of change requests. In examples, such change requests may comprise a plurality of requests similar to change request 314, and may be received by UI 110 in succession or as a sequence of change requests. For instance, a user working on editing first document 320 may perform a plurality of different change operations, such as adding a new table, adding a text box, inserting, and formatting text within the text box, etc.

In such a scenario where a plurality of change requests is received by UI 110, change initiator 302 may batch the change requests prior to transmitting change indication 316 to document generation system 120 upon a threshold number of change requests being received. In other words, change indication 316 may comprise a batch or aggregation of change requests that are to be made to first document 320. Upon receiving change indication 316 comprising a batch of change requests, document generation system 120 may generate an updated document definition implementing each change contained therein, and process the updated document definition to generate updated intermediate format representation 312 for providing to client device 102. In some other implementations, change indication 316 transmitted by change initiator 302 may comprise an updated document definition that is generated at client device 102, and document generation system 120 may generate and provide updated intermediate format representation 312 based on the updated document definition that is received containing the change requests.

In yet some other implementations, change initiator 302 may transmit, to document generation system 120, a change indication comprising an identification of the change to be made to document definition or an updated document definition each time a change is made (e.g., as change requests are received in UI 110). In such instances, document generation system 120 may batch the change indications such that processing an updated document definition is performed after a threshold number of change indications are received.

Thus, in accordance with implementations, document generation system 120 may provide updated intermediate format representation to client device 102 after a threshold number of change requests are received in UI 110. It is also noted that batching as described herein, either by change initiator 302 or document generation system 120, need not be based on a threshold number of change requests received in UI 110, but rather may be performed in other manners as well. For instance, batching of changes by change initiator 302 or document generation system 120 may be performed based on a time period (e.g., batching changes until a threshold time has passed), or a combination thereof.

Further, in implementations where changes may be batched or aggregated such that cache 108 and/or UI renderer 308 receive updated intermediate format representation 312 after a threshold (e.g., in number or time) has been reached, format representation modifier 306 may continue to generate locally modified intermediate format representation 310 containing the plurality of the received changes, and UI renderer 308 may render locally modified document 322 containing the plurality of received changes. In this manner, locally modified intermediate format representation 310 may be modified to implement each of the received changes locally, and locally modified document 322 containing the plurality of changes may be rendered in UI 110, prior to document system 120 receiving an indication of the changes and/or providing updated intermediate format representation 312 to client device 102.

Figure 5:
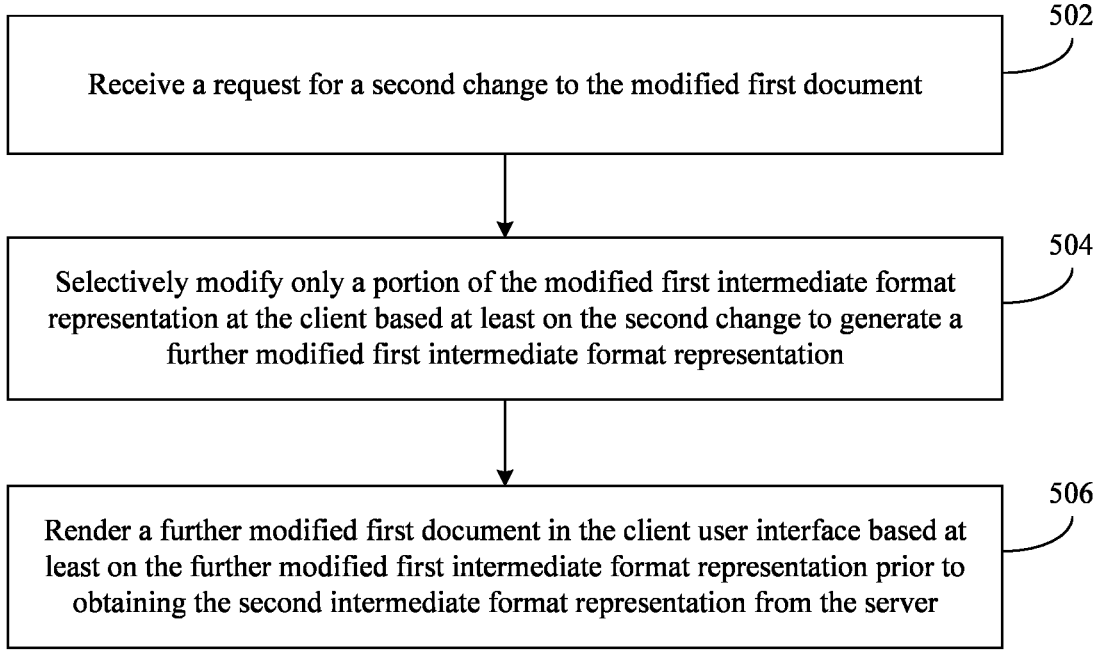
FIG. 5 shows a flowchart of a method for rendering a further modified document in a client user interface, in accordance with an example embodiment.

As will also be discussed in greater detail below, format representation modifier 306 may generate locally modified intermediate format representation 310 and UI renderer may render locally modified document 322 after each change request is received, such that rendering of locally modified documents containing a user's change operations is continuously performed prior to updated intermediate format representation 312 is received from document generation system 120. For example, FIG. 5 shows a flowchart of a method for rendering a further modified document in a client user interface, in accordance with an example embodiment. In an implementation, the method of flowchart 500 may be implemented by change rendering system 106. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a request for a second change to the modified first document is received. For instance, change initiator 302 may receive change request 314 to locally modified document 322 rendered in UI 110. As noted earlier, locally modified document 322 is rendered by UI renderer 308 based on locally modified intermediate format representation 310. In other words, change request 314 may be received for a document rendered in UI 110 contains a representation (e.g., an approximation) of a previously obtained change request. In examples, such an additional change request (or requests) may be received for locally modified document 322 in instances where updated intermediate format representation 312 has not yet been generated and/or received from document generation system 120. Such change requests may comprise any request to change any aspect of locally modified document 322, in a similar manner as described above with respect to change requests received for modifications to first document 320.

In step 504, only a portion of the modified first intermediate format representation is selectively modified at the client based at least on the second change to generate a further modified first intermediate format representation. For instance, with reference to FIG. 3, format representation modifier 306 may further selectively modify only a portion of locally modified intermediate format representation 310 based at least on the additional change request received for locally modified document 322. In examples, the further modified first intermediate format representation may be stored in cache 108 that may be accessed by UI renderer 308 for rendering, as described below. Step 504 may be performed in a similar manner as described above with respect to 206 of flowchart 200. However, it is noted that in step 504, format representation modifier 306 may modify a previous version of the intermediate format representation that has already been modified to include a first change (e.g., as described with respect to step 206). In other words, in accordance with techniques described herein, format representation modifier 306 may perform one or more further modifications to locally modified intermediate format representation 310 based on further change request received in UI 110, even if updated intermediate format representation 312 has not been received from document generation system 120 implementing the further change requests.

In step 506, a further modified first document in the client user interface is rendered based at least on the further modified first intermediate format representation prior to obtaining the second intermediate format representation from the server. For instance, with reference to FIG. 3, UI renderer 308 may be configured to render a further locally modified document in UI 110 based at least on the further modified first intermediate format representation stored in cache 108. In this manner, the further locally modified document rendered in UI 110 may comprise representations including a plurality of changes made to first document 320. In implementations, UI renderer 308 may render the further locally modified document in UI 110 prior to obtaining updated intermediate format representation 312 from document generation system 120. In other words, a document that has already been modified locally and rendered as described herein may further be modified to include one or more additional changes, enabling users to continue editing documents in UI 110 rather than waiting for document generation system 120 to provide an updated intermediate format representation 312 from which a fully regenerated document can be rendered.

Figure 6:
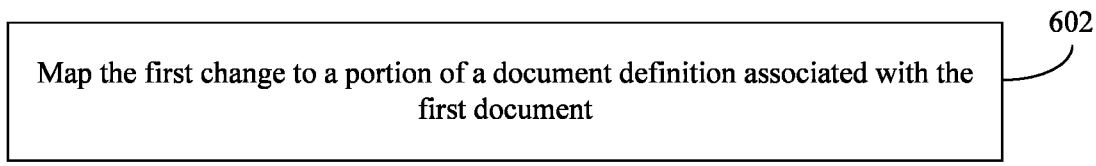
FIG. 6 shows a flowchart of a method for mapping a change to a portion of a document definition, in accordance with an example embodiment.

As described above, changes made to a document may be mapped to a document definition from which the document is generated. For example, FIG. 6 shows a flowchart of a method for mapping a change to a portion of a document definition, in accordance with an example embodiment. In an implementation, the method of flowchart 600 may be implemented by change initiator 302. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a first change is mapped to a portion of a document definition associated with the first document. For instance, with reference to FIG. 3, change initiator 302 may be configured to map change request 314 to a portion of document definition 122 associated with first document 320. In implementations, client device 102 comprises a copy of document 122. Upon receiving change request 314, change initiator 302 may determine, based on a mapping of the change to document definition 122, which portion or portions of document definition 122 should be modified to implement change request 314. It is also noted and understood that in some implementations, such mapping may be performed by document generation system 120.

Upon mapping change request 314 to document definition 122, change initiator 302 may, in some implementations, modify the portions of document definition 122 to implement the change and provide the updated document definition to document generation system 120, such that document generation system 120 may generate an updated intermediate format representation for rendering in UI 110. In other words, change indication 316 provided by change initiator 302 to document generation system 320 may comprise at least a change to a portion or portions of the document corresponding to change request 314.

Further, in some implementations, format representation modifier 306 may determine based on this mapping which portion or portions of intermediate format representation 104 should be selectively modified to include a representation of the change. Accordingly, once format representation modifier 306 generates locally modified intermediate format representation 310 based at least on the mapping, UI renderer 308 may render locally modified document 322 on UI 110 using the locally modified intermediate format representation that includes a representation of change request 314.

Additional non-limiting embodiments and illustrations of the above techniques will now be described. It is understood that features of such additional example embodiments and illustrations are not required in all implementations. In the additional example embodiments and illustrations, techniques may be implemented by one or more of client device 102, intermediate format representation 104, change rendering system 106, cache 108, UI 110, document 112, source data 116, server 118, document generation system 120, document definition 122, document generator 124, change initiator 302, client renderer 304, format representation modifier 306, UI renderer 308, locally modified intermediate format representation 310 updated intermediate format representation 312, change request 314, change indication 316, browser 318, first document 320, locally modified document 322, second document 324, service 702, client 704, user input 706, data 708, expression evaluation 710, processing and rendering engine 712, operation 714, generated document 716, client 802, and/or service 804. Further, any one or more steps of flowcharts 200, 400, 500, and/or 600 may be implemented in accordance with any of the techniques described below. Other structural and operational implementations will be apparent to persons skilled in the relevant art(s) based on the following discussion.

Figure 7:
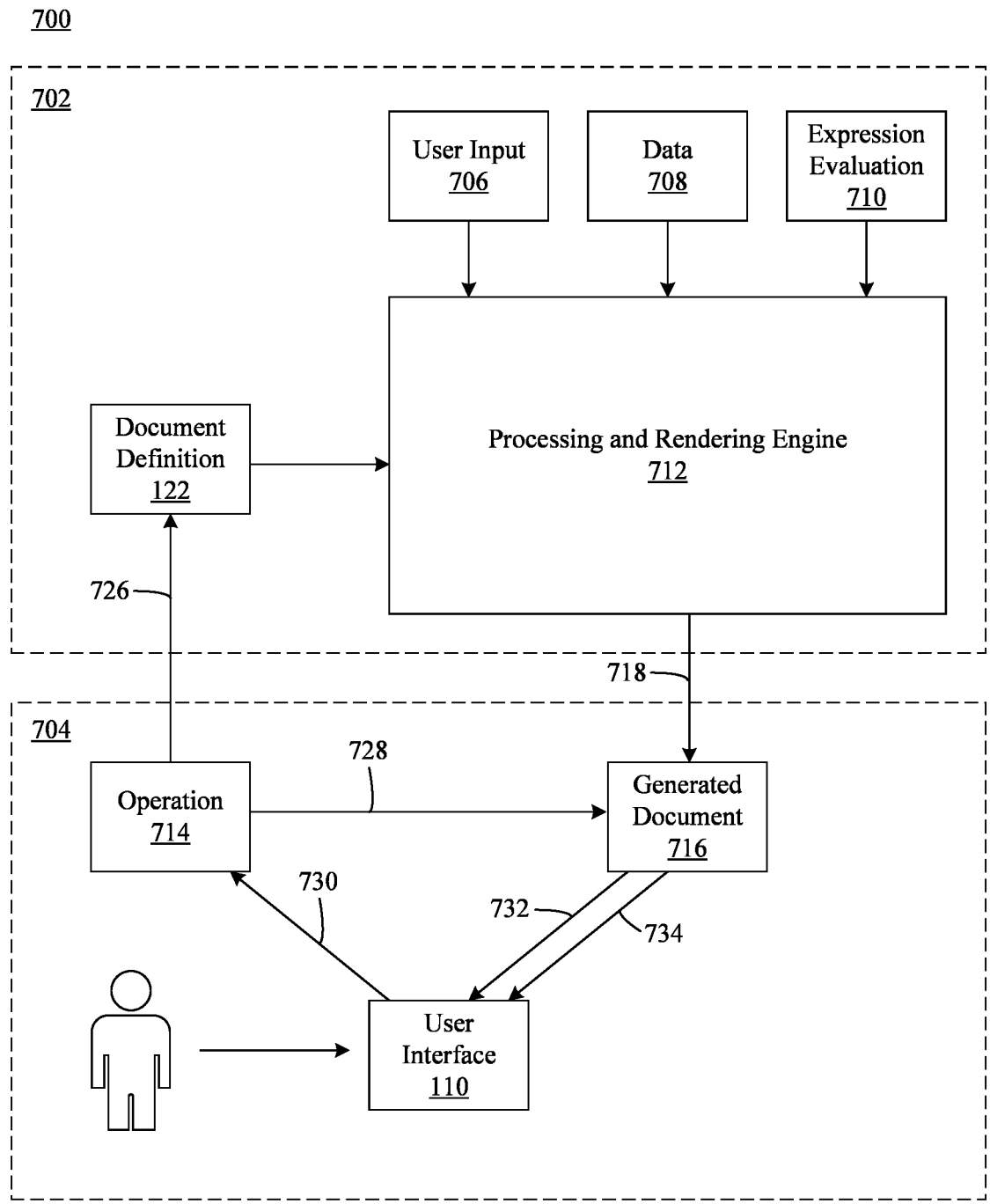
FIG. 7 shows a block diagram of an illustrative change rendering system, in accordance with an example embodiment.

For instance, FIG. 7 shows a block diagram of an illustrative change rendering system 700, in accordance with an example embodiment. In this illustrative arrangement, system 700 includes a UI 110, a document definition 122, a user input 706, data 708, expression evaluation 710, a processing and rendering engine 712, an operation 714, and a generated document 716. As shown in FIG. 7, document definition 122, user input 706, data 708, expression evaluation 710, and processing and rendering engine 712 may be implemented at a server 702. UI 110, operation 714, generated document 716 may be implemented at a client 704. Server 702 may be an example of server 118, and client 704 may be an example of client device 102 as described above.

In examples, a user may interact with UI 110 to edit a final document (e.g., What You See Is What You Get, also referred to as WYSIWYG), rather than a design layout that is then rendered. For instance, values of aggregations, number of pages, flow of a table, etc. will be the same whether editing or viewing a report in UI 110, allowing for an easier learning curve for users editing documents UI 110. In implementations, when a user views a paginated document or report, a source report definition language (RDL) may be deserialized, and a resulting RDL object model (e.g., a code that represents actual objects in the RDL) may be passed to processing and rendering engine 712. After this, the resulting RDL object model may be transformed into another format (e.g., a JSON render processing layout, or a JSON RPL), which may be rendered in UI 110. In examples, the RPL may comprise an intermediate state or format representation (e.g., intermediate format representation) that represents a report or document after processing. Such an intermediate state or format representation may contain data positioned and laid out (e.g., data, formatting, and pagination) as described by the RDL object model or document definition and is consumed by UI renderer 308. The RPL may be serialized into a JSON RPL in some implementations, which may defer a final layout rendering to client device 102. In such a flow, the RDL object model may describe how a report should be laid out, and the rendered JSON RPL may describe the appearance of the final report after data has been obtained and processed.

As noted earlier, rendering and processing (or re-processing) of a report may be a time-consuming activity that can result in delays in getting a final report being displayed on UI 110. Many actions a user performs when building a report, however, may have a relatively narrow impact (e.g., moving a document element on a page), or can be approximated on a page (e.g., changing a text box font). Other actions may result in data being retrieved, such as adding a column in a table.

As shown in FIG. 7, a user may interact with UI 110 to perform an edit operation. Edit operations may be received in a variety of ways, such as by selecting a visual and/or interacting with an edit panel that identifies properties that may be edited that may be presented to the user. In other examples, users may directly interact with certain document elements, such as by selecting a table column to resize the width of a column, or moving a visual on a page. In other examples, an edit operation may be performed through other methods, such as by interacting with indirect sources of edits (e.g., edit operations in a toolbar, such as undo or redo operations). Editing, as described herein, may include any type of editing of a document, including but not limited to editing a document element and/or its properties, adding a new element, deleting an existing element, editing document properties, etc.

When operation 714 is obtained 730, local RDL object model in client device 102 may be updated and two flows may be initiated. In a first flow, the edit action may be applied 728 to a previously generated document 716 received from the server. In examples, a transform may be applied 728 (e g , immediately) to a local cached JSON RPL (which may be an example of an intermediate format as discussed herein), based on the type or category of edit action. An approximation of the generated document that includes the edit operation may be rendered 732 on UI 110 in a manner as described herein. For instance, for some operations that may be minor or do not require fetching additional data (e.g., bolding a text box), the same or similar JSON RPL may be generated that would be obtained from a full server render, and may result in a rendering of an approximated document that is similar to the final document from the server. For some other operations that may be more complex or require fetching additional data (e.g., adding a new field to an existing table), the transform may add an intermediate state that uses fake data or a placeholder, such that an updated render can still be performed.

In a second flow, the edit operation may be applied 726 to document definition 122, and processing and rendering engine 712 may then regenerate 718 the document containing the change from the updated definition based on user input 706, data 708, and expression evaluation 710 as defined in the document definition. For instance, this second flow may result in patching a server copy of the RDL object model to initiate a new render, which may result in updating of the cached JSON RPL at the client with accurate rendering information. In some implementations, the server may also provide an updated RDL object model that implements the edit operation. An updated generated document may then be rendered 734 on UI 110 as an accurate regeneration of the document that includes the user's edit operation. In some instances, edits may be batched into a single render that may improve the responsiveness of UI 110. It is also noted that in some further embodiments, UI 110 may be selectively render only portions of a report that require updating to further improve responsiveness in the UI.

In example implementations, server 702 may be configured to handle caching of data, full fidelity rendering, and/or may be the general interface with other components (e.g., saving reports or report definitions to a data store). Client 704 may contain logic relating to editing and authoring documents. For instance, for any edit operation received, components of client 704 may generate an action that server 702 will understand to generate an updated document, and client 704 may patch an immediate preview of that action to the latest cached JSON RPL such that UI 110 may render an approximation of the actions during the time server 702 performs the full regeneration. In some instances, if a session is lost between the client and server, the client may be configured to reapply operations to recreate a state prior to the lost session.

Figure 8:
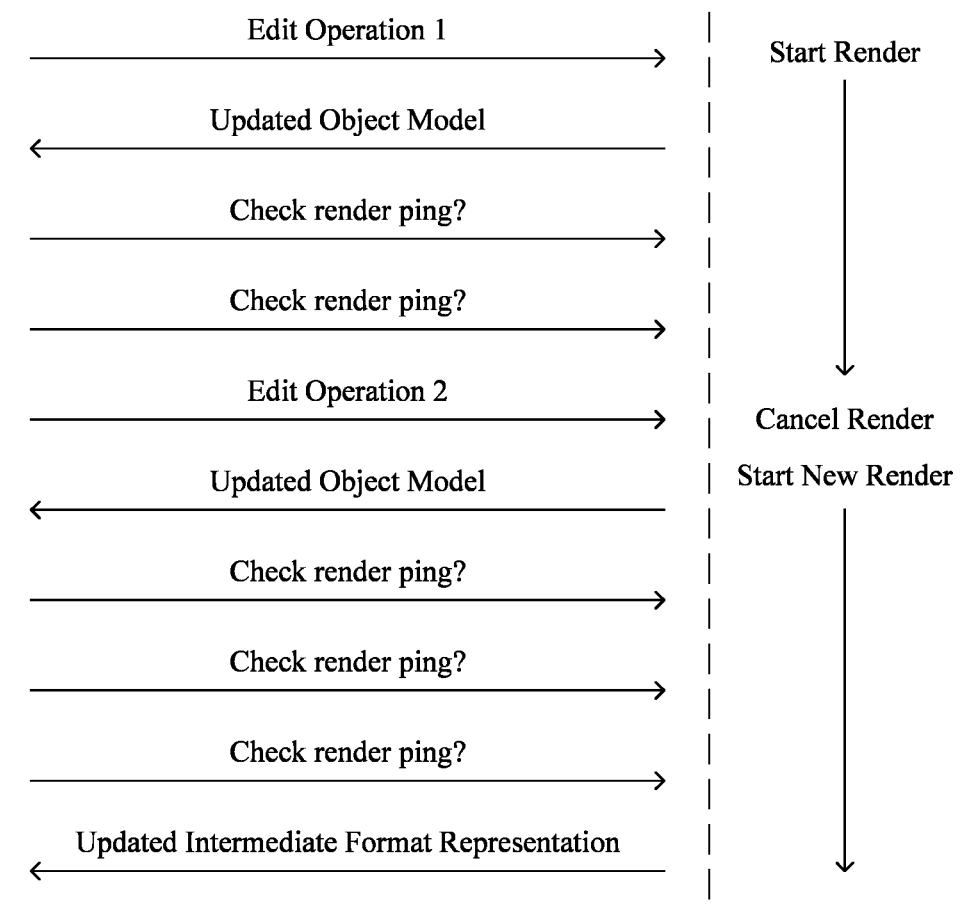
FIG. 8 shows a communication flow of an illustrative example implementing techniques described herein, in accordance with an example embodiment.

FIG. 8 shows a communication flow 800 of an illustrative example implementing techniques described herein, in accordance with an example embodiment. As shown in FIG. 8, a client 802 may be in communication with a service 804. Client 802 may be an example implementation of client device 102 and/or client 704, and service 804 may be an example implementation of a service implemented on server 118 and/or server 702. In implementations, client 802 and server 804 may be communicating in any suitable manner, such as via one or more APIs or other protocols (e.g., REpresentational State Transfer (REST), WebSockets, etc.). As illustrated in FIG. 8, client 802 may transmit a first edit operation to service 804. Upon receiving the first edit operation, service 804 may return an updated object model that implements the first edit operation, or alternatively a patch of an object model that may be present locally on client 802. Service 804 may also begin a render, or reprocessing of the updated object model in order to generate an updated intermediate format representation that may be used to render the updated document on UI 110 that includes a representation of the first edit operation. Upon receiving the first edit operation, client 802 may also modify a local intermediate format representation that may be used to render an approximation of the first edit operation, in accordance with techniques described herein. In examples, such a modified render at the client may be performed until another edit operation is received or until the service provides an updated intermediate format representation. In examples, client 802 may also be configured to execute a ping operation to check with the service to determine if the render has completed.

In the example shown in FIG. 8, before the render is completed at the server, client 802 may transmit a second operation to service 804 and may receive an updated object model containing that implements both the first and second edit operations therefrom. In a similar manner as described earlier, client 802 may also locally modify an intermediate format representation to implement both the first and second edit operations, such that the modified representation may be used to render an updated document in UI 110 until the service provides a new intermediate format representation. When service 804 receives the second edit operation prior to completion of the first render, service 804 may cancel the current render in progress and begin a new render that implements both the first and second edit operations. Client 802 may again ping the service to determine if the rendering has completed at the server. Upon completion of the render at the service, servicer 804 may transmit an updated intermediate format representation (e.g., a JSON RPL) to the client that implements the first and second edit operations, or alternatively a patch to a previously transmitted JSON RPL that may already be present on the client. Client 802 may use the received JSON RPL to render an updated document on UI 110 that contains a representation of both the first and second edit operations.

It is noted that in some implementations, service 804 may determine if it will render each change as they are received or if it will aggregate the change with one or more other changes prior to rendering. Based on the response of service 804, if there is a render that is running and the client is waiting on, a connection between the client and service can remain open. If data is ready to be returned by the service, a new JSON RPL may be provided from the service to the client. If data is not ready to be returned, a job identifier may be returned, and the client may send another request to check if the job has been completed. In some further implementations, if the service is not able to return the data during a predetermined time period (e.g., a time period in which a connection is to remain open) and a render is in queue or is being processed, the client may send another request to see if the job was completed. In some instances, the service may return a notification to the client indicating that the render is currently in queue or being processed, and the connection may remain open for an extended time period. However, if no render is in queue or is being processed, the connection can be closed. Such techniques may be used where different visuals may be rendered separately. For example, with charts, while the rest of the report is rendering, the service can return a new chart image prior to returning other information in the report, and the client can override the cached JSON RPL with the information that is returned from the server.

As discussed above, batching of edit actions may also be performed in some implementations. For instance, when the client receives multiple actions in quick succession, the client may be configured to batch the edit operations together when sending the actions to the service. Similarly, such batching may occur in instances where an edit action may inherently comprise a plurality of actions (e.g., modifying a table which may also require modifying a dataset). In such examples, the operations may be batched together when locally rendering the document and/or sending the edit actions to the service.

In some other implementations, service 804 may be configured to perform one or more background renders in addition to the renders illustrated in FIG. 8. For instance, as shown in FIG. 8, a render may be cancelled by service 804 in instances where an additional operation is received prior to the completion of a previously started render. In such instances, service 804 may be delayed in completing a render that implements the user's actions, such as where a steady stream of user actions is arriving at service 804 resulting in a plurality of cancelled renders. Accordingly, in some implementations, service 804 may be configured to perform one or more background renders that do not get cancelled by new edit actions, such that once the background render is completed with the first edit operation, it may be provided to the client for rendering.

Thus, in accordance with techniques described herein, a user may be able to view, in UI 110, immediate feedback of edit operations performed on a document without having to wait for the service to perform a full render. In the background the client may notify the service and initiate a background full fidelity render which the client will render when available. For many operations, such a full fidelity render may be the same or similar from the local approximation, while some other actions may result in minor visual tweaks (e.g., font size change rendered locally may cause the height of another document element to change, which will be obtained in the full fidelity render from the service). As discussed earlier, certain types of actions may require additional data (e.g., adding a field to a table), but in such instances, a visual placeholder may be inserted in the local render that will be replaced after the service render completes.

It is noted and understood that such examples are illustrative only, and not intended to be limiting. For instance, any number of edit operations may be received in any order and with any timing. As discussed herein, UI 110 may continuously render updated versions of the document based on locally modified intermediate format representations implementing the edit operations until the service responds with an updated full fidelity render.

As described above, in some examples, an author may initiate multiple operations in quick succession in which case the full regeneration of earlier operations by the server may not have completed before a newer operation makes them out of date. In such a case where a full document regeneration completes that is out of date because the author has initiated more recent operations, the more recent operations may be reapplied to the most recent generated document. In this manner, as the author may be provided more accurate representations of the document over time as updated renderings are received from the server.

Figure 9:
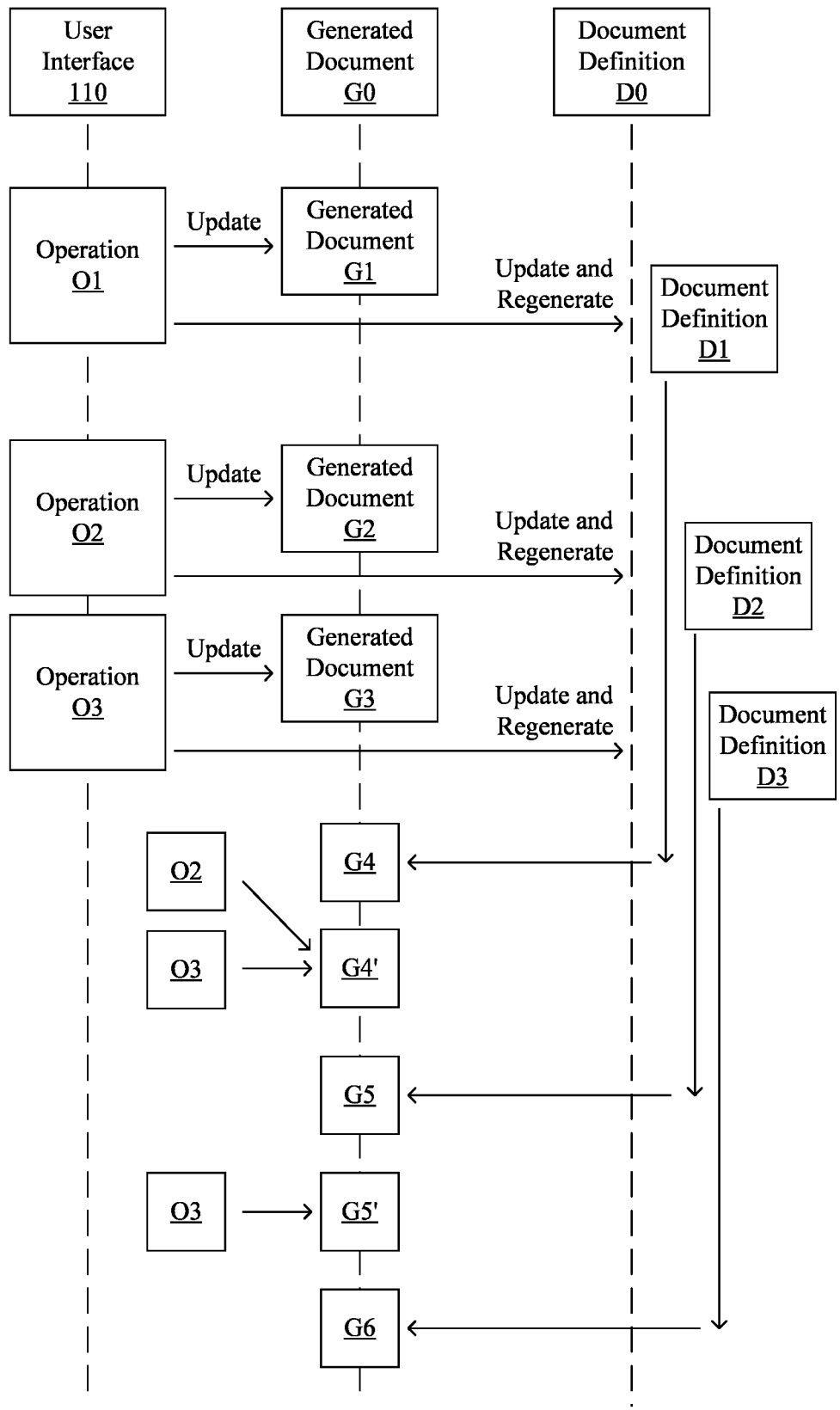
FIG. 9 shows a communication flow of another illustrative example implementing techniques described herein, in accordance with an example embodiment.

For instance, FIG. 9 shows a communication flow 900 of an illustrative example implementing techniques described herein, in accordance with an example embodiment. As shown in FIG. 9, UI 110 may be configured to begin with rendering of a generated document G0 from a document definition D0. A first operation O1 may be received at UI 110, after which a locally generated document G1 may be rendered in accordance with techniques described herein (e.g., by locally modifying an intermediate format representation at client device 102). Client device 102 may also send a change indication to server 118 to generate an updated document definition D1 that implements operation O1, upon which a render at server 118 is commenced corresponding to operation O1.

Prior to receiving an updated render from server 118 (shown at the right side of FIG. 9), UI 110 may receive a second operation O2. Client device may locally generate an updated generated document G2 that is a modification of generated document G1. Client device may similarly send a change notification to server 118 to generate an updated document definition D2 that implements operation O2 (or alternatively, pending operations O1 and O2). UI 110 may subsequently receive a third operation O3, upon which a similar process is performed (e.g., rendering a further updated generated document G3, where G3 contains an approximation of the operations O1, O2, and O3, and providing a change notification to server 118 to generate an updated document definition D3.

As shown in FIG. 9, after operation 3 is received at UI 110, client device 102 may receive an updated intermediate format representation from server 118 that may be used to render a document G4 at UI 110. However, since document G4 is based on document definition D1 that only implements operation O1, document G4 only contains a representation of operation O1. In such instances, operations O2 and O3 may be reapplied on document G4 such that a generated document G4' may be rendered at UI 110 that contains operations O1, O2, and O3, where operation O1 is based on a full fidelity render at server 118 and operations O2 and O3 are approximations rendered locally. In examples, client device 102 may be configured to keep track of which changes have been sent to server 118 for which an updated intermediate format representation has been received, which changes have been sent to server 118 for which an updated intermediate format representation has not been received, and/or which changes have been rendered locally, such that client device 102 may determine which changes may need to be reapplied once an update is received from the server. Such changes may be marked or tracked in any suitable fashion, such as in a log, a database, etc.

Similarly, client device 102 may receive an updated intermediate format representation from server 118 that may be used to render a document G5 at UI 110. However, since document G5 is based on document definition D2 that only implements operations O1 and O2, document G5 only contains representations of operations O1 and O2. In a similar manner as described above, operation O3 may be reapplied such that a generated document G5' may be rendered at UI 110 that contains operations O1, O2, and O3, where operation O1 and O2 are based on a full fidelity render at server 118 and operation O3 is an approximation rendered locally. Subsequently, once the final render is completed at the server, UI 110 may render a generated document G6 that is based on document definition D3 that is a full fidelity render of operations O1, O2, and O3. In this manner, UI 110 may be configured to provide immediate feedback (e.g., approximations) on a continuous basis that are sufficiently close to the final generated output, and which becomes more accurate over time (e.g., as updated renderings are received from the server).

As noted earlier, in some implementations, edit operations may be batched. For instance, change indications may be sent to server 118 after a threshold number of change requests are received. If one or more additional change requests are received after the threshold number of changes are received and sent to the server but before the server has responded with an updated intermediate format representation, the client device can continue to approximate changes with the additional changes in UI 110. After an updated render has been received for the batch of changes that has been sent, the additional changes may be reapplied as approximations in a similar manner as described herein.

In some other implementations, batching of edit operations may be based on a type or category of edit operations. For instance, batching may be performed for certain types of changes that are relatively minor or which do not require additional data to be obtained (e.g., font changes, color changes, etc.), while other types of changes that require additional data (e.g., adding a new column of data to a table) may be sent to server 118 upon receiving the change request to trigger a server re-render. In such instances, local renders containing representations of those changes (e.g., approximations) may still be performed as described herein, such as by including placeholders or other temporary or fake data in the rendered document until the server provides an updated intermediate format representation.

In some further implementations, UI 110 may be configured to block a user from making one more additional change to a rendered document. For instance, if a threshold number of approximated changes have been rendered on a document and/or if the approximations are the result of relatively major changes (e.g., adding new data to a document), one or more additional changes may be blocked until the server provides an updated intermediate format representation. Still further, in such instances, UI 110 may still allow certain other types of changes to be made to the rendered document even prior to the server providing the updated intermediate format representation, such as minor changes as described herein (e.g., changes to font colors, etc.).

In yet other examples, operation of client device 102 and/or server 118 (and subcomponents thereof) may be based on any combination of the described techniques. For instance, server 118 may be configured to optionally cancel an in-progress render where additional change indications are received prior to completion of the render, server 118 may implement one or more background renders, client device 102 and/or server 118 may optionally batch certain types of changes, or carry out any other manner of rendering changes as described herein.

III. Example Computer System Implementation

Client device 102, change rendering system 106, cache 108, UI 110, source data 116, server 118, document generation system 120, document generator 124, change initiator 302, client renderer 304, format representation modifier 306, UI renderer 308, browser 318, processing and rendering engine 712, client 802, service 804, flowchart 200, flowchart 400, flowchart 500, and/or flowchart 600 may be implemented in hardware, or hardware combined with one or both of software and/or firmware. For example, client device 102, change rendering system 106, cache 108, UI 110, source data 116, server 118, document generation system 120, document generator 124, change initiator 302, client renderer 304, format representation modifier 306, UI renderer 308, browser 318, processing and rendering engine 712, client 802, service 804, flowchart 200, flowchart 400, flowchart 500, and/or flowchart 600 may be implemented as computer program code/instructions configured to be executed in one or more processors and stored in a computer readable storage medium.

Alternatively, client device 102, change rendering system 106, cache 108, UI 110, source data 116, server 118, document generation system 120, document generator 124, change initiator 302, client renderer 304, format representation modifier 306, UI renderer 308, browser 318, processing and rendering engine 712, client 802, service 804, flowchart 200, flowchart 400, flowchart 500, and/or flowchart 600 may be implemented as hardware logic/electrical circuitry.

For instance, in an embodiment, one or more, in any combination, of client device 102, change rendering system 106, cache 108, UI 110, source data 116, server 118, document generation system 120, document generator 124, change initiator 302, client renderer 304, format representation modifier 306, UI renderer 308, browser 318, processing and rendering engine 712, client 802, service 804, flowchart 200, flowchart 400, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
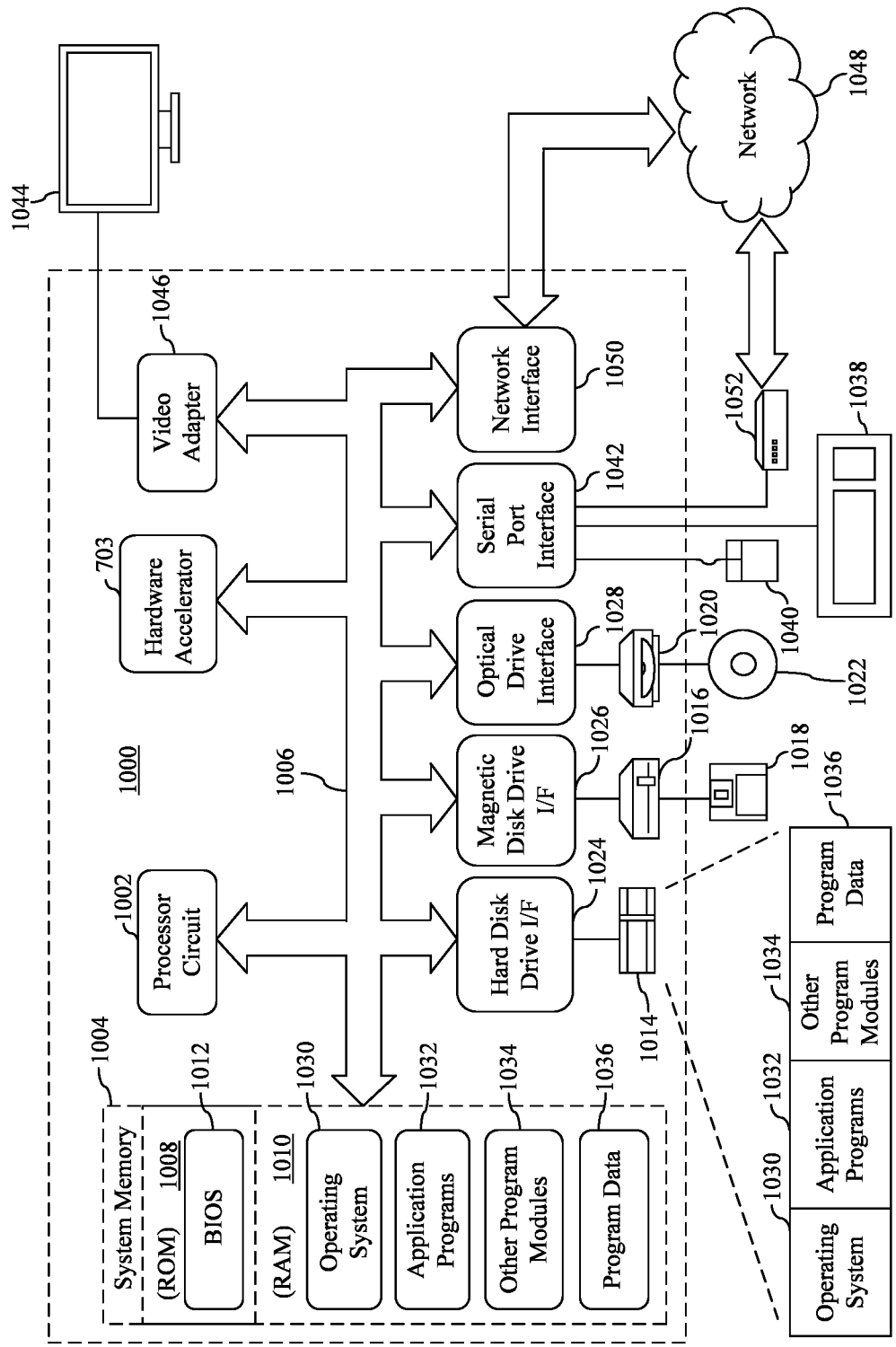
FIG. 10 is a block diagram of an example processor-based computer system that may be used to implement various embodiments.

FIG. 10 depicts an exemplary implementation of a computing device 1000 in which embodiments may be implemented. For example, client device 102, change rendering system 106, cache 108, UI 110, source data 116, server 118, document generation system 120, document generator 124, change initiator 302, client renderer 304, format representation modifier 306, UI renderer 308, browser 318, processing and rendering engine 712, client 802, service 804, flowchart 200, flowchart 400, flowchart 500, and/or flowchart 600 (and/or any of the steps of flowcharts 200, 400, 500, and 600 described therein) may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 10-02, a hardware accelerator 1003, a system memory 1004, and a bus 1006 that couples various system components including system memory 1004 to processor circuit 1002 and hardware accelerator 1003. Processor circuit 1002 and/or hardware accelerator 1003 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing any of the features of client device 102, change rendering system 106, cache 108, UI 110, source data 116, server 118, document generation system 120, document generator 124, change initiator 302, client renderer 304, format representation modifier 306, UI renderer 308, browser 318, processing and rendering engine 712, client 802, service 804, flowchart 200, flowchart 400, flowchart 500, and/or flowchart 600 and/or further embodiments described herein.

A user may enter commands and information into computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for rendering document changes is disclosed herein. The system includes: at least one processor circuit; and at least one memory that stores program code configured to be executed by the at least one processor circuit, the program code comprising: a change initiator configured to: receive a request for a first change to a first document rendered in a client user interface, the first document rendered based at least on a first intermediate format representation obtained from a server; transmit information indicative of the first change to the first document to the server; and a client renderer configured to: selectively modify only a portion of the first intermediate format representation at the client based on the first change; render a modified first document in the client user interface based at least on the modified first intermediate format representation; obtain a second intermediate format representation from the server, the second intermediate format representation comprising an intermediate format representation generated through processing a document definition that has been updated based at least on the information indicative of the first change to the first document; and render a second document in the client user interface based at least on the second intermediate format representation.

In one embodiment of the foregoing system, the modified first document includes a representation of the first change that is different from a representation of the first change that is included in the second document.

In another embodiment of the foregoing system, the representation of the first change included in the modified first document includes a placeholder for information that is included in the representation of the first change included in the second document.

In another embodiment of the foregoing system, the representation of the first change included in the modified first document includes a document element that has a different size than a document element included the representation of the first change included in the second document.

In another embodiment of the foregoing system, the client renderer is configured to obtain the second intermediate format representation from the server after a threshold number of change requests.

In another embodiment of the foregoing system, the change initiator is further configured to receive a request for a second change to the modified first document; and the client renderer is configured to: selectively modify only a portion of the modified first intermediate format representation at the client based at least on the second change to generate a further modified first intermediate format representation; and render a further modified first document in the client user interface based at least on the further modified first intermediate format representation prior to obtaining the second intermediate format representation from the server.

In another embodiment of the foregoing system, the change initiator is configured to map the first change to a portion of a document definition associated with the first document; and the information indicative of the first change to the first document comprises a change to the portion of the document definition.

A method for rendering document changes is disclosed herein. The method includes: receiving a request for a first change to a first document rendered in a client user interface, the first document rendered based at least on a first intermediate format representation obtained from a server; transmitting information indicative of the first change to the first document to the server; selectively modifying only a portion of the first intermediate format representation at the client based on the first change; rendering a modified first document in the client user interface based at least on the modified first intermediate format representation; obtaining a second intermediate format representation from the server, the second intermediate format representation comprising an intermediate format representation generated through processing a document definition that has been updated based at least on the information indicative of the first change to the first document; and rendering a second document in the client user interface based at least on the second intermediate format representation.

In one embodiment of the foregoing method, the modified first document includes a representation of the first change that is different from a representation of the first change that is included in the second document.

In another embodiment of the foregoing method, the representation of the first change included in the modified first document includes a placeholder for information that is included in the representation of the first change included in the second document.

In another embodiment of the foregoing method, the representation of the first change included in the modified first document includes a document element that has a different size than a document element included the representation of the first change included in the second document.

In another embodiment of the foregoing method, the obtaining the second intermediate format representation from the server is performed after a threshold number of change requests.

In another embodiment of the foregoing method, the method further includes receiving a request for a second change to the modified first document; selectively modifying only a portion of the modified first intermediate format representation at the client based at least on the second change to generate a further modified first intermediate format representation; and rendering a further modified first document in the client user interface based at least on the further modified first intermediate format representation prior to obtaining the second intermediate format representation from the server.

In another embodiment of the foregoing method, the method further includes: mapping the first change to a portion of a document definition associated with the first document; and wherein the information indicative of the first change to the first document comprises a change to the portion of the document definition.

A computer-readable storage medium is disclosed herein. The computer-readable storage medium has program instructions recorded thereon that, when executed by at least one processor of a computing device, perform a method, the method comprising: receiving a request for a first change to a first document rendered in a client user interface, the first document rendered based at least on a first intermediate format representation obtained from a server; transmitting information indicative of the first change to the first document to the server; selectively modifying only a portion of the first intermediate format representation at the client based on the first change; rendering a modified first document in the client user interface based at least on the modified first intermediate format representation; obtaining a second intermediate format representation from the server, the second intermediate format representation comprising an intermediate format representation generated through processing a document definition that has been updated based at least on the information indicative of the first change to the first document; and rendering a second document in the client user interface based at least on the second intermediate format representation.

In one embodiment of the foregoing computer-readable storage medium, the modified first document includes a representation of the first change that is different from a representation of the first change that is included in the second document.

In another embodiment of the foregoing computer-readable storage medium, the representation of the first change included in the modified first document includes a placeholder for information that is included in the representation of the first change included in the second document.

In another embodiment of the foregoing computer-readable storage medium, the representation of the first change included in the modified first document includes a document element that has a different size than a document element included the representation of the first change included in the second document.

In another embodiment of the foregoing computer-readable storage medium, the method further includes: receiving a request for a second change to the modified first document; selectively modifying only a portion of the modified first intermediate format representation at the client based at least on the second change to generate a further modified first intermediate format representation; and rendering a further modified first document in the client user interface based at least on the further modified first intermediate format representation prior to obtaining the second intermediate format representation from the server.

In another embodiment of the foregoing computer-readable storage medium, the method further includes: mapping the first change to a portion of a document definition associated with the first document; and the information indicative of the first change to the first document comprises a change to the portion of the document definition.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for rendering document changes, the system comprising:
   at least one processor circuit; and
   at least one memory that stores program code configured to be executed by the at least one processor circuit, the program code, when executed by the at least one processor circuit, causes the system to:
      receive a request for a first change to a first document rendered in a client user interface, the first document rendered in a first format based at least on a first intermediate format representation comprising a second format that is different than the first format and generated by a server upon processing an initial document definition, the initial document definition defining, in a computer language, at least an arrangement of content to be rendered in the first document;
      transmit information indicative of the first change to the first document to the server;
      selectively modify only a portion of the first intermediate format representation at the client to include an approximation of the first change;
      render a modified first document that includes the approximation of the first change in the client user interface based at least on the modified first intermediate format representation;
      obtain a second intermediate format representation from the server, the second intermediate format representation comprising an intermediate format representation generated through processing a document definition that has been updated based at least on the information indicative of the first change to the first document; and
      render a second document in the client user interface that includes a representation of the first change based at least on the second intermediate format representation, the representation of the first change being different from the approximation of the first change.

2. The system of claim 1, wherein the approximation of the first change included in the modified first document includes a placeholder for information that is included in the representation of the first change included in the second document.

3. The system of claim 1, wherein the approximation of the first change included in the modified first document includes a document element that has a different size than a document element included in the representation of the first change included in the second document.

4. The system of claim 1, wherein the program code, when executed by the at least one processor circuit, further causes the system to:
   obtain the second intermediate format representation from the server after a threshold number of change requests.

5. The system of claim 1, wherein the program code, when executed by the at least one processor circuit, further causes the system to:
   receive a request for a second change to the modified first document;
   selectively modify only a portion of the modified first intermediate format representation at the client based at least on the second change to generate a further modified first intermediate format representation; and
   render a further modified first document in the client user interface based at least on the further modified first intermediate format representation prior to obtaining the second intermediate format representation from the server.

6. The system of claim 1, wherein the program code, when executed by the at least one processor circuit, further causes the system to:
   map the first change to a portion of a document definition associated with the first document; and
   wherein the information indicative of the first change to the first document comprises a change to the portion of the document definition.

7. The system of claim 2, wherein the information included in the representation of the first change included in the second document comprises data obtained from a data source, and the placeholder included in the first document does not comprise the data.

8. A method for rendering document changes, the method comprising:
   receiving a request for a first change to a first document rendered in a client user interface, the first document rendered in a first format based at least on a first intermediate format representation comprising a second format that is different than the first format and generated by a server upon processing an initial document definition, the initial document definition defining, in a computer language, at least an arrangement of content to be rendered in the first document;
   transmitting information indicative of the first change to the first document to the server;
   selectively modifying only a portion of the first intermediate format representation at the client to include an approximation of the first change;
   rendering a modified first document that includes the approximation of the first change in the client user interface based at least on the modified first intermediate format representation;
   obtaining a second intermediate format representation from the server, the second intermediate format representation comprising an intermediate format representation generated through processing a document definition that has been updated based at least on the information indicative of the first change to the first document; and
   rendering a second document in the client user interface that includes a representation of the first change based at least on the second intermediate format representation, the representation of the first change being different from the approximation of the first change.

9. The method of claim 8, wherein the approximation of the first change included in the modified first document includes a placeholder for information that is included in the representation of the first change included in the second document.

10. The method of claim 8, wherein the approximation of the first change included in the modified first document includes a document element that has a different size than a document element included in the representation of the first change included in the second document.

11. The method of claim 8, wherein the obtaining the second intermediate format representation from the server is performed after a threshold number of change requests.

12. The method of claim 8, further comprising:
receiving a request for a second change to the modified first document;
selectively modifying only a portion of the modified first intermediate format representation at the client based at least on the second change to generate a further modified first intermediate format representation; and
rendering a further modified first document in the client user interface based at least on the further modified first intermediate format representation prior to obtaining the second intermediate format representation from the server.

13. The method of claim 8, further comprising:
mapping the first change to a portion of a document definition associated with the first document; and
wherein the information indicative of the first change to the first document comprises a change to the portion of the document definition.

14. The method of claim 9, wherein the information included in the representation of the first change included in the second document comprises data obtained from a data source, and the placeholder included in the first document does not comprise the data.

15. A computer-readable storage medium having program instructions recorded thereon that, when executed by at least one processor of a computing device, perform a method, the method comprising:
receiving a request for a first change to a first document rendered in a client user interface, the first document rendered in a first format based at least on a first intermediate format representation comprising a second format that is different than the first format and generated by a server upon processing an initial document definition, the initial document definition defining, in a computer language, at least an arrangement of content to be rendered in the first document;
transmitting information indicative of the first change to the first document to the server;
selectively modifying only a portion of the first intermediate format representation at the client to include an approximation of the first change;
rendering a modified first document that includes the approximation of the first change in the client user interface based at least on the modified first intermediate format representation;
obtaining a second intermediate format representation from the server, the second intermediate format representation comprising an intermediate format representation generated through processing a document definition that has been updated based at least on the information indicative of the first change to the first document; and
rendering a second document in the client user interface that includes a representation of the first change based at least on the second intermediate format representation, the representation of the first change being different from the approximation of the first change.

16. The computer-readable storage medium of claim 15, wherein the approximation of the first change included in the modified first document includes a placeholder for information that is included in the representation of the first change included in the second document.

17. The computer-readable storage medium of claim 15, wherein the approximation of the first change included in the modified first document includes a document element that has a different size than a document element included in the representation of the first change included in the second document.

18. The computer-readable storage medium of claim 15, wherein the method further comprises:
receiving a request for a second change to the modified first document;
selectively modifying only a portion of the modified first intermediate format representation at the client based at least on the second change to generate a further modified first intermediate format representation; and
rendering a further modified first document in the client user interface based at least on the further modified first intermediate format representation prior to obtaining the second intermediate format representation from the server.

19. The computer-readable storage medium of claim 15, wherein the method further comprises:
mapping the first change to a portion of a document definition associated with the first document; and
wherein the information indicative of the first change to the first document comprises a change to the portion of the document definition.

20. The computer-readable storage medium of claim 16, wherein the information included in the representation of the first change included in the second document comprises data obtained from a data source, and the placeholder included in the first document does not comprise the data.

* * * * *